(12) United States Patent
Li et al.

(10) Patent No.: US 8,102,079 B2
(45) Date of Patent: Jan. 24, 2012

(54) DYNAMIC VOLTAGE COMPENSATOR USED IN THREE-PHASE POWER SUPPLY SYSTEM

(75) Inventors: Jian Duo Li, Shanghai (CN); Yue Zhuo, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 368 days.

(21) Appl. No.: 12/379,666

(22) Filed: Feb. 26, 2009

(65) Prior Publication Data

US 2009/0224729 A1 Sep. 10, 2009

(30) Foreign Application Priority Data

Feb. 28, 2008 (CN) .......................... 2008 1 0080666

(51) Int. Cl.
*H02J 3/12* (2006.01)
*H02J 5/00* (2006.01)
(52) U.S. Cl. ............................. 307/103; 307/45; 307/46
(58) Field of Classification Search .................... 307/45, 307/46, 103
See application file for complete search history.

(56) References Cited

U.S. PATENT DOCUMENTS

| | | | |
|---|---|---|---|
| 5,376,828 A * | 12/1994 | Kim et al. ...................... 307/64 |
| 7,821,157 B2 * | 10/2010 | Llorente Gonzelez et al. . 307/47 |
| 2005/0012395 A1 * | 1/2005 | Eckroad et al. .................. 307/44 |
| 2008/0315684 A1 * | 12/2008 | Cheng et al. .................... 307/45 |

* cited by examiner

*Primary Examiner* — Rexford Barnie
*Assistant Examiner* — Hal Kaplan
(74) *Attorney, Agent, or Firm* — Harness, Dickey & Pierce, P.L.C.

(57) ABSTRACT

A dynamic voltage compensator for compensating voltage fluctuations in a three-phase power supply system that includes two dynamic voltage restorers (DVR), and two phases are selected arbitrarily from the three-phase power supply system with each selected power supply phase connected in series with one of said dynamic voltage restorers respectively. The dynamic voltage restorers are each used to monitor the voltage between the power supply phase it is connected to and the power supply phase unselected, and to restore the voltage to a normal level when voltage fluctuation is monitored, and at the same time the phase voltage of the unselected phase can also be restored to its normal level. In this way, it can ensure that the phase voltages of the three phases can be restored to the normal level by using only two sets of single-phase DVRs.

13 Claims, 6 Drawing Sheets

DYNAMIC VOLTAGE COMPENSATOR USED IN THREE-PHASE POWER SUPPLY SYSTEM

PRIORITY STATEMENT

The present application hereby claims priority under 35 U.S.C. §119 on Chinese patent application number CN 200810080666.7 filed Feb. 28, 2008, the entire contents of which is hereby incorporated herein by reference.

TECHNICAL FIELD

At least one embodiment of the present invention generally relates to the field of a power supply in a power distribution system and, more particularly, relates to the compensation of voltage fluctuations by utilizing a dynamic voltage restorer in a three-phase power supply system.

BACKGROUND ART

In the past few years, with the dramatic increase in applications of power supply-sensitive electronic equipment in the field of process control and automation, the problem of power supply quality has attracted more and more attention. This is because this problem will result in process interruption, and bring about considerable economic losses to industrial customers. The voltage fluctuation is considered to be the most destructive one among the problems of power supply quality which can affect the power supply quality of a power distribution system. Series custom power compensation is regarded as a desirable and efficient method for improving the power supply quality due to its fast response and high reliability. For example, a device utilizing such a method is a dynamic voltage restorer (DVR), which can reduce the effects of voltage fluctuations on the power supply side by injecting energy into a downstream sensitive load.

A hardware structural diagram of a typical DVR used in a single-phase system is shown in FIG. 1.

As shown in FIG. 1, the DVR is mainly composed of the following parts:

a voltage source converter (VSC): the VSC controlled by pulse width modulation (PWM) or other modes is the most important constituent part in the DVR, and it is used to synthesize an injection voltage by utilizing a power-electronic device (such as IGBT, MOEFET, etc.) in a pulse width modulation inverter. In the present application, a typical structure of the VSC is listed as follows: three single-phase fullbridge VSCs, each of which comprises four pairs of an IGBT (G) and a diode (D). This patent application can also be utilized in VSCs with other structural types.

An energy storage: a direct current (DC) end of the VSC is to be connected to an energy source or an energy storage device with an appropriate capacity. The energy storage device will supply necessary energy to the VSC, and it can generate an injection voltage. Such an energy storage can be shared by three phases together, and it is also possible to have one energy storage for each phase. This energy storage can be an energy storage device such as a battery, a large capacity capacitor, etc.

An isolation transformer: the purpose for including the isolation transformer is to boost the injection voltage generated by the VSC and to couple the injection voltage into a feeding circuit. The coil ratio of a boosting transformer has been chosen carefully so as to enable the VSC to compensate any flash voltage sag with a minimal DC connection voltage. In some DVR designs, the isolation transformer can be omitted.

A harmonic filter: the output of the VSC controlled by PWM will contain a large quantity of high-order harmonics due to the high on-off frequency of the VSC. Therefore, it is necessary to use a harmonic filter system so as to supply a cleaned injection voltage on the primary side of the isolation transformer. Normally, the filter system is composed of an L-C part, and the value of the filter element will rely on the frequency of the voltage of high-order harmonics generated by the VSC.

In the figure, $V_S$ and $V_L$ represent respectively the voltages at the power supply side and the load side of the DVR. These values are easily measured. The DVR installed between a protected load and its power supply bus can use the injection voltage $V_{inj}$ from the DVR to cancel the voltage fluctuations appearing in $V_S$, so as to ensure a high-quality load voltage.

As to the DVRs used in three-phase three-wire or three-phase four-wire systems, if only their hardware structures are considered, without considering the possibility that they share a common energy storage, they can actually be regarded as a combination of three single-phase DVRs. The hardware structure of a three-phase DVR is shown in FIG. 2. In FIG. 2, there is a by-pass switch connected between the power supply side and the load side, for choosing whether or not to connect the DVR.

FIG. 2 shows clearly a three-phase DVR for monitoring the phase voltages ($\vec{V}_{Sa}$, $\vec{V}_{Sb}$, $\vec{V}_{Sc}$) at the power supply side. Once a voltage fluctuation appears in the system, the DVR injects the voltage components ($\vec{V}_{inja}$, $\vec{V}_{injb}$, $\vec{V}_{injc}$) into each phase, so as to restore the phase voltages ($\vec{V}_{La}$, $\vec{V}_{Lb}$, $\vec{V}_{Lc}$) at the load side to the nominal level, and this can be described as:

$$\vec{V}_{La} = \vec{V}_{Sa} + \vec{V}_{inja}$$

$$\vec{V}_{Lb} = \vec{V}_{Sb} + \vec{V}_{injb}$$

$$\vec{V}_{Lc} = \vec{V}_{Sc} + \vec{V}_{injc} \qquad (1)$$

Due to the use of three single-phase DVRs for reducing voltage fluctuations in conventional three-phase power supply systems, the costs thereof are relatively high.

SUMMARY

At least one embodiment of the present invention proposes a novel dynamic voltage compensator using a DVR to compensate voltage fluctuations in a three-phase power supply system. In at least one embodiment, what differs from the prior configurations comprising three single-phase DVRs is that in at least one embodiment of the present invention, only two single-phase DVRs are used to realize the compensation of voltage fluctuations in a three-phase power supply.

According to one aspect of at least one embodiment of the present invention, a dynamic voltage compensator for a three-phase power supply system is provided: said dynamic voltage compensator comprises two dynamic voltage restorers; wherein two phases are selected arbitrarily from said three-phase power supply system, with each selected power supply phase connected in series to one of said dynamic voltage restorers respectively; and said dynamic voltage restorers are used to monitor the voltages between the power supply phases they are connected to and the power supply phase unselected (i.e. the line voltages between the selected phases and the unselected phase), and to restore the voltages to their nominal values when a voltage fluctuation is monitored. By restoring the two monitored line voltages to the normal level, the phase voltage of the unselected phase can also be restored automatically to the normal level. In this way, it can ensure that the phase voltages of three phases can be restored to the normal level by using only two sets of single-phase dynamic voltage restorers.

According to another aspect of at least one embodiment of the present invention, the dynamic voltage restorer comprises a voltage source converter, and said voltage source converter comprises at least one pair of a power electronic switch and a diode, for synthesizing an injection voltage.

According to another aspect of at least one embodiment of the present invention, the dynamic voltage restorer comprises an energy storage for supplying energy to the voltage source converter and for generating the injection voltage.

According to another aspect of at least one embodiment of the present invention, the dynamic voltage restorer comprises a harmonic filter for filtering high-order harmonic voltage generated by the voltage source converter.

According to another aspect of at least one embodiment of the present invention, the dynamic voltage restorer comprises an isolation transformer for boosting the injection voltage generated by the voltage source converter and for coupling the injection voltage into a power supply circuit.

According to another aspect of at least one embodiment of the present invention, the power electronic switch is an IGBT or MOSFET, and it also can be other power electronic switches known in the art.

According to another aspect of at least one embodiment of the present invention, the dynamic voltage compensator comprises a by-pass switch connected between a power supply and a load, and isolating switches arranged respectively between the dynamic voltage restorers and the power supply, and between the dynamic voltage restorers and the load.

According to another aspect of at least one embodiment of the present invention, the dynamic voltage compensator is used in a three-phase three-wire power supply system.

According to another aspect of at least one embodiment of the present invention, the dynamic voltage compensator is used in a three-phase four-wire power supply system.

By using the dynamic voltage compensator proposed in at least one embodiment of the present invention, roughly one-third of the total number of components can be reduced. There is no doubt that the reduced costs of DVRs will be a strong attraction to users.

DETAILED DESCRIPTION OF THE EXAMPLE EMBODIMENTS

Figure 1:
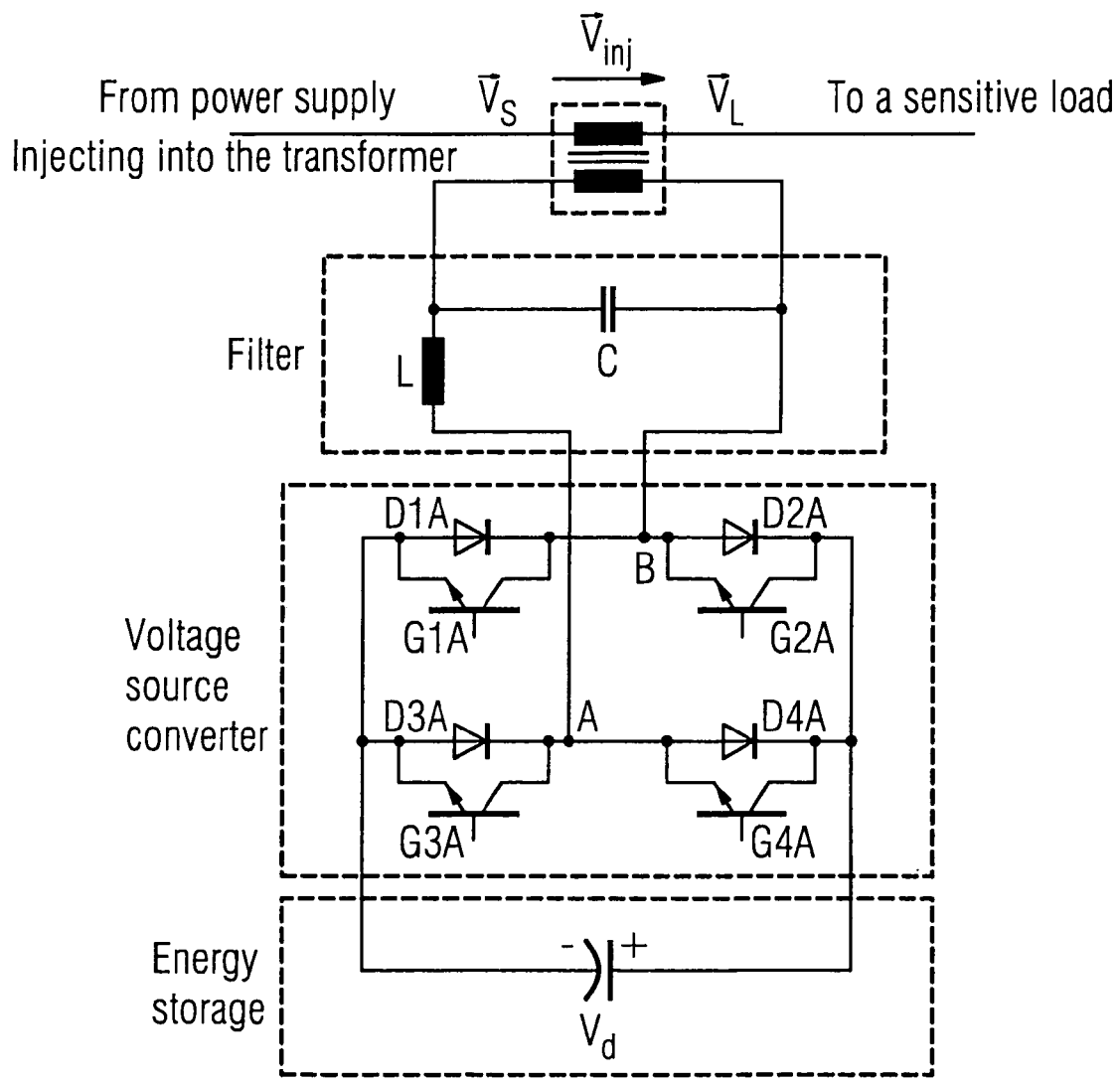
FIG. 1 is the hardware structure of a single-phase DVR.
Figure 2:
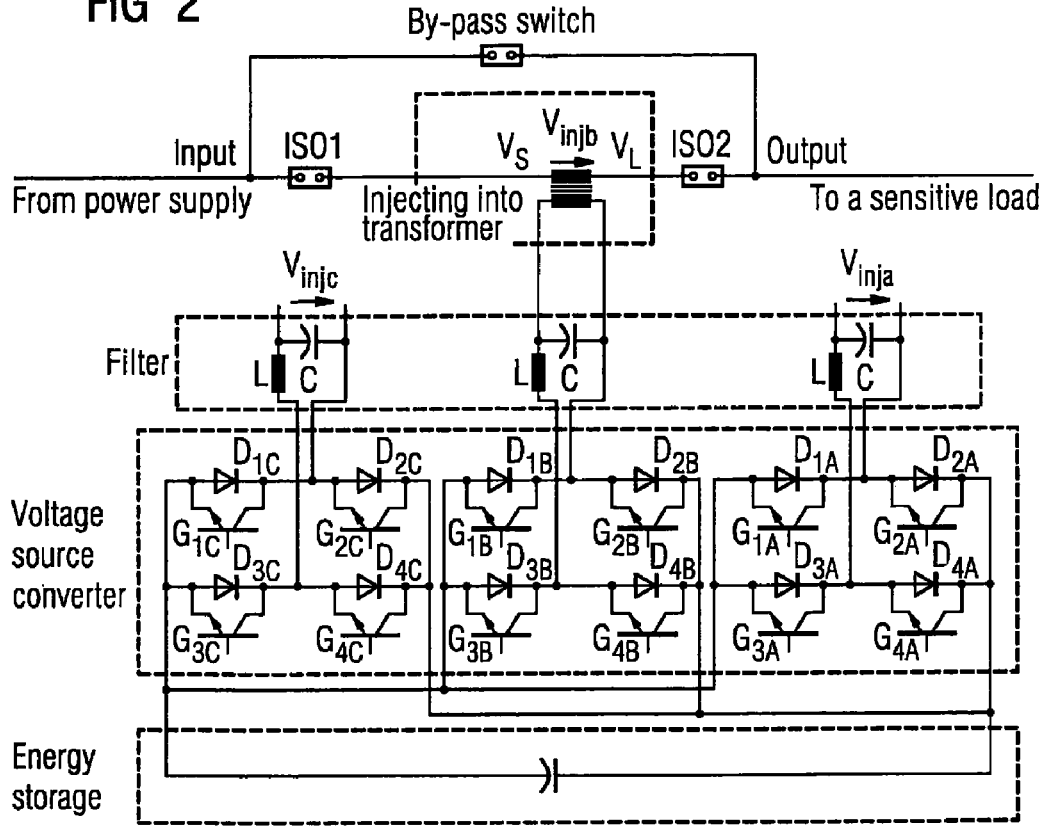
FIG. 2 is the hardware structure of a three-phase DVR.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 3:
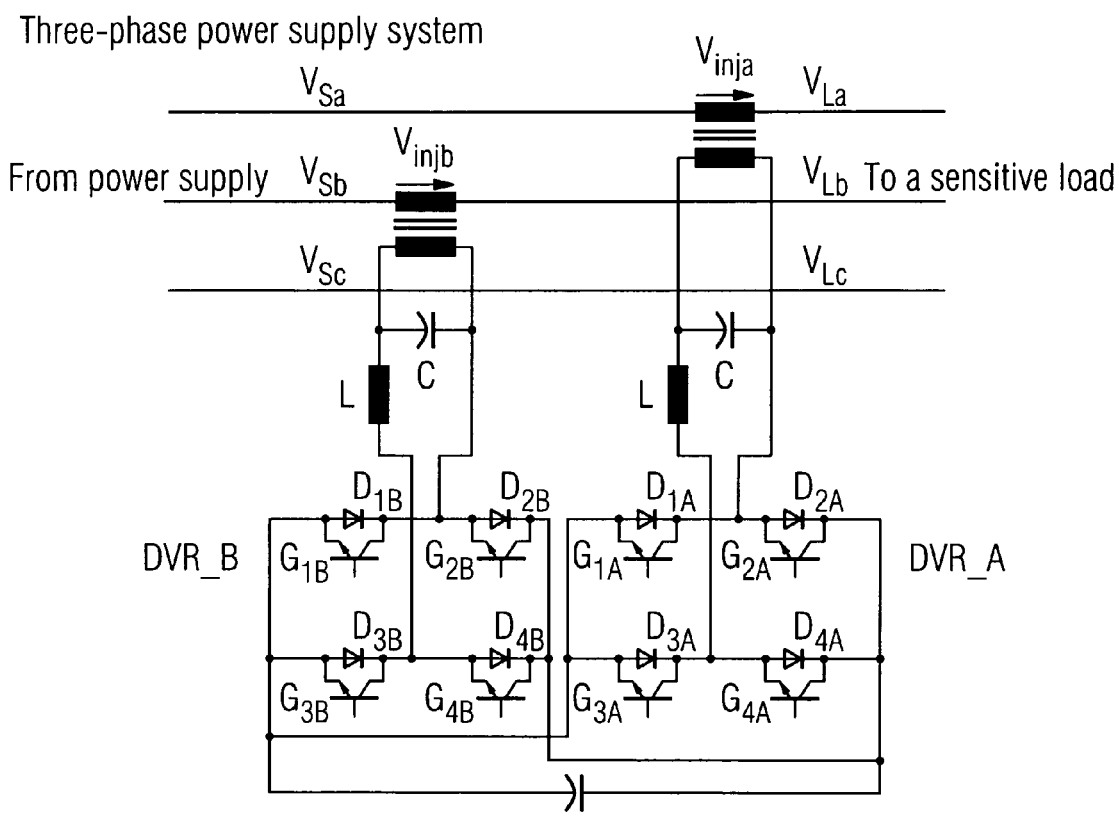
FIG. 3 is an example of a DVR structure of an embodiment of the present invention for use in a three-phase power supply system.

FIG. 3 shows a structure of a DVR specially used in a three-phase three-wire system according to an embodiment of the present invention. Compared with the structures of the prior three-phase DVRs, this novel structure is composed of only two single-phase DVRs, but it can accomplish the function of compensating voltage fluctuations in a three-phase power supply.

In order to realize the function of compensating three-phase voltage fluctuations with the DVR of an embodiment of the present invention, the basic control principles of the novel DVR are different from the prior three-phase DVRs.

As mentioned previously, in the prior designs, a three-phase DVR can be regarded as a combination of three single-phase DVRs, and it measures the voltages from the phase to earth for each phase and injects voltage components, so as to restore directly the voltages from the phases to earth on the load side to their nominal levels respectively.

However, in the novel DVR proposed in an embodiment of the present invention, there are only two single-phase DVRs, and said DVRs can each have an energy storage or both of then can share an energy storage. As shown in FIG. 3, said DVRs are connected respectively to phase A and phase B in series. For the sake of easy explanation, they can be referred to respectively as DVR_A and DVR_B. What differs from the prior power supply systems using three single-phase DVRs is that, according to the present invention, during the operation, DVR_A and DVR_B will each monitor the line voltages $\vec{V}_{Sac}$ (between phase A and phase C) and $\vec{V}_{Sbc}$ (between phase B and phase C) on the power supply side, rather than the voltages from the phases to the earth as in the prior designs. Once a voltage fluctuation appears in the system, DVR_A will inject a voltage component ($\vec{V}_{inja}$) so as to restore the line voltage ($\vec{V}_{Lac}$) at the load side to its level before the fluctuation, and at the same time, DVR_B will ensure that $\vec{V}_{Lbc}$ is restored to the normal level in the same way (by injecting $\vec{V}_{injb}$). By utilizing the symmetrical nature of the three-phase three-wire power supply system, the line-to-line voltage $\vec{V}_{Lab}$ between phase A and phase B on the load side can be restored simultaneously to their levels before the fluctuation. In addition, in this compensation method, the voltage of each phase on the load side can also be restored automatically to its nominal value.

Figure 4:
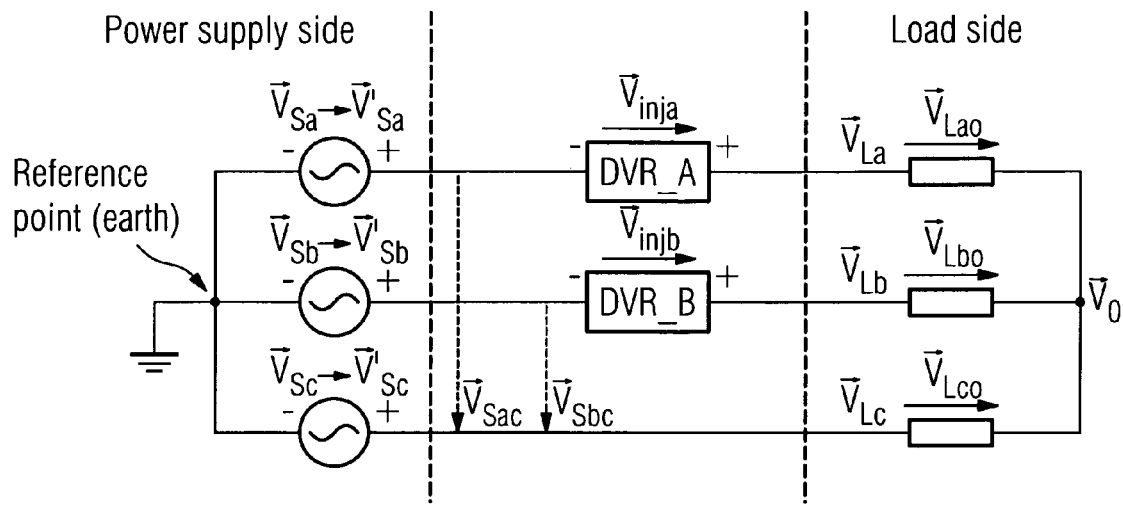
FIG. 4 is an example of a DVR structure of an embodiment of the present invention used in a three-phase three-wire power supply system.

The compensation principles of the DVR of an embodiment of the present invention will be further explained in detail below:

based on FIG. 3, the typical DVR structure in the three-wire system is shown in FIG. 4.

Figure 5:
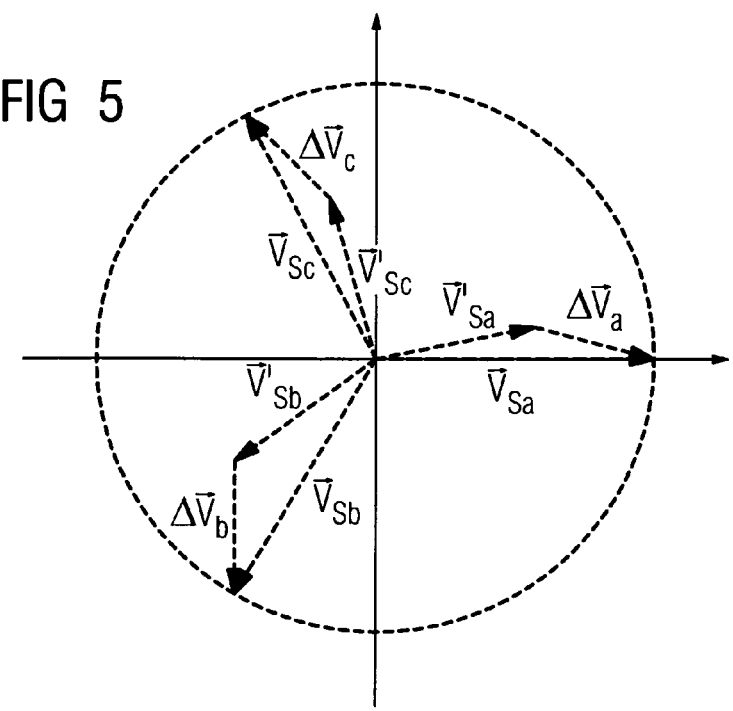
FIG. 5 is a vector graph when a voltage fluctuation appears.

Assuming when a voltage fluctuation appears in the system, the voltages $\vec{V}_{Sa}$, $\vec{V}_{Sb}$, $\vec{V}_{Sc}$ from the phases to earth on the power supply side will be changed to $\vec{V}'_{Sa}$, $\vec{V}'_{Sb}$, $\vec{V}'_{Sc}$, with the amount of change in each phase being $\Delta\vec{V}_a$, $\Delta\vec{V}_b$, $\Delta\vec{V}_c$, and they can be illustrated by the vector graph shown in FIG. 5. Please note that all the vectors hereinafter will be based on the reference points shown in FIG. 4 unless it is specifically stated otherwise.

According to the above definition, the following equations can be obtained to describe the voltages from the phases to earth:

$$\vec{V}_{Sa} = \vec{V}'_{Sa} + \Delta\vec{V}_a$$

$$\vec{V}_{Sb} = \vec{V}'_{Sb} + \Delta\vec{V}_b$$

$$\vec{V}_{Sc} = \vec{V}'_{Sc} + \Delta\vec{V}_c \quad (2)$$

Based on the control principles of the DVR of an embodiment of the present invention, DVR_A and DVR_B will monitor respectively the line-to-line voltages $\vec{V}_{Sac}$ and $\vec{V}_{Sbc}$ on the power supply side, and in combination with the equations (2), it can produce:

$$\vec{V}_{Sac} = \vec{V}_{Sa} - \vec{V}_{Sc} = \vec{V}'_{Sa} + \Delta\vec{V}_a - \vec{V}'_{Sc} - \Delta\vec{V}_c = \vec{V}'_{Sac} + \Delta\vec{V}_a - \Delta\vec{V}_c$$

$$\vec{V}_{Sbc} = \vec{V}_{Sb} - \vec{V}_{Sc} = \vec{V}'_{Sb} + \Delta\vec{V}_b - \vec{V}'_{Sc} - \Delta\vec{V}_c = \vec{V}'_{Sbc} + \Delta\vec{V}_b - \Delta\vec{V}_c \quad (3)$$

wherein $\vec{V}'_{Sac}$ and $\vec{V}'_{Sbc}$ denote the line-to-line voltages on the power supply side during the voltage fluctuation monitored by DVR_A and DVR_B.

In addition, the voltages are injected from DVR_A and DVR_B, so that $\vec{V}_{Lac}$ and $\vec{V}_{Lbc}$ will be restored to their levels before the fluctuation. Note that before the voltages are injected from DVRs, $\vec{V}_{Lac} = \vec{V}_{Sac}$ and $\vec{V}_{Lbc} = \vec{V}_{Sbc}$. Therefore, it can be seen clearly from equations (3) that:

$$\vec{V}_{inja} = \vec{V}_{Sac} - \vec{V}'_{Sac} = \Delta\vec{V}_a - \Delta\vec{V}_c$$

$$\vec{V}_{injb} = \vec{V}_{Sbc} - \vec{V}'_{Sbc} = \Delta\vec{V}_b - \Delta\vec{V}_c \quad (4)$$

Therefore, after the voltages have been injected from DVR_A and DVR_B, $\vec{V}_{Lac}$ and $\vec{V}_{Lbc}$ can be restored to their nominal levels before the fluctuation, and referring to FIG. 4, the voltages from the phases to earth on the load side are:

$$\vec{V}_{La} = \vec{V}'_{Sa} + \vec{V}_{inja} = \vec{V}'_{Sa} + \Delta\vec{V}_a - \Delta\vec{V}_c = \vec{V}_{Sa} - \Delta\vec{V}_c$$

$$\vec{V}_{Lb} = \vec{V}'_{Sb} + \vec{V}_{injb} = \vec{V}'_{Sb} + \Delta\vec{V}_b - \Delta\vec{V}_c = \vec{V}_{Sb} - \Delta\vec{V}_c$$

$$\vec{V}_{Lc} = \vec{V}'_{Sc} = \vec{V}_{Sc} - \Delta\vec{V}_c \quad (5)$$

Figure 6:
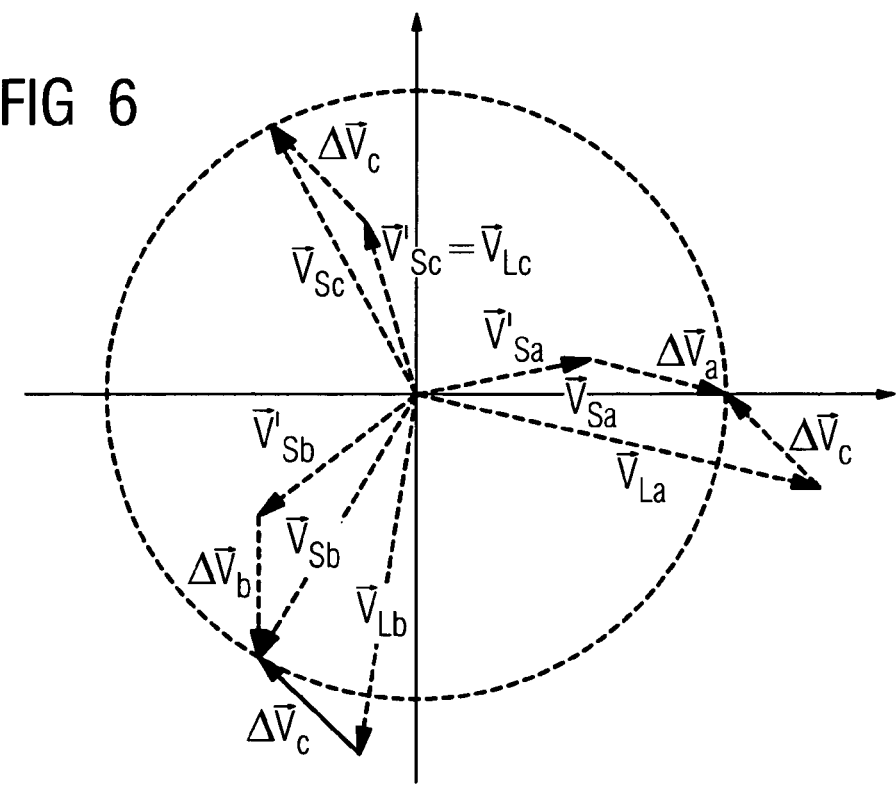
FIG. 6 is a vector graph for compensation.

The corresponding vector graph is shown in FIG. 6.

It can be seen from FIG. 5 that the line-to-line voltage $\vec{V}_{Lab}$ between phase A and phase B on the load side is:

$$\vec{V}_{Lab} = \vec{V}_{La} - \vec{V}_{Lb} = (\vec{V}_{Sa} - \Delta\vec{V}_c) - (\vec{V}_{Sb} - \Delta\vec{V}_c) = \vec{V}_{Sa} - \vec{V}_{Sb} = \vec{V}_{Sab} \quad (6)$$

Figure 7:
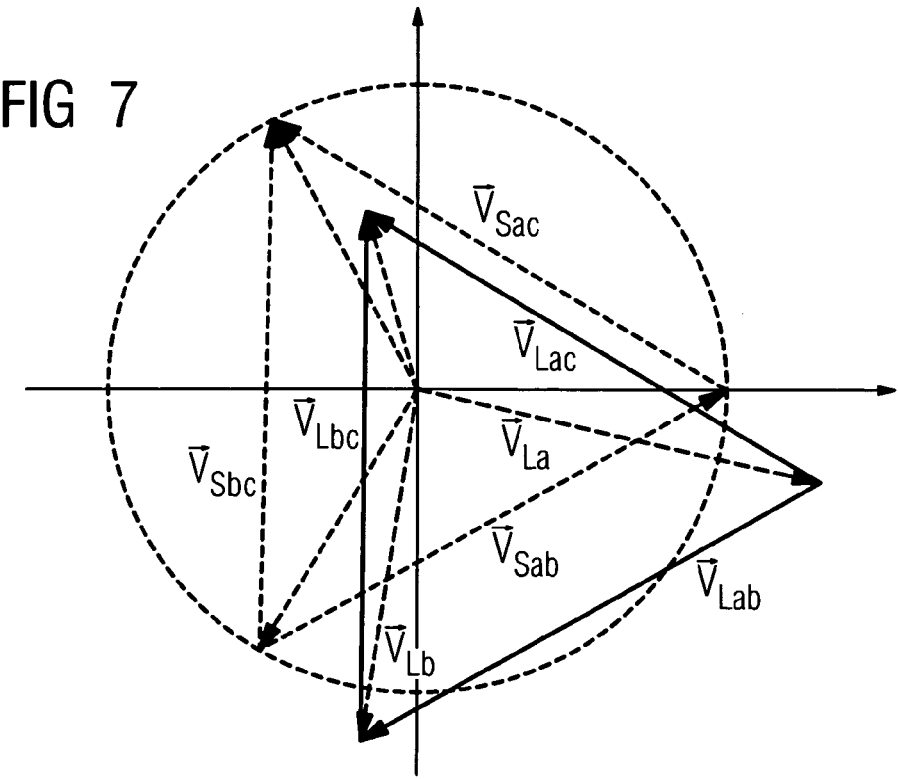
FIG. 7 is a vector graph of a line-to-line voltage.

Equation (6) shows clearly that $\vec{V}_{Lab}$ has been restored automatically to its level before the fluctuation, as shown in FIG. 7.

On the other hand, we have also noted that after the compensation, the voltage $\vec{V}_o$ at the center point on the load side can be deduced from (5):

$$\vec{V}_o = \frac{1}{3}(\vec{V}_{La} + \vec{V}_{Lb} + \vec{V}_{Lc}) \quad (7)$$

$$= \frac{1}{3}(\vec{V}_{Sa} + \vec{V}_{Sb} + \vec{V}_{Sc} - 3\Delta\vec{V}_c)$$

$$= -\Delta\vec{V}_c$$

This means that $\vec{V}_o$ has moved from 0 to $-\Delta\vec{V}_c$. Through the equations (5) and by referring to FIG. 4, the voltages on the load side are:

$$\vec{V}_{Lao} = \vec{V}_{La} - \vec{V}_o = \vec{V}_{Sa}$$

$$\vec{V}_{Lbo} = \vec{V}_{Lb} - \vec{V}_o = \vec{V}_{Sb}$$

$$\vec{V}_{Lco} = \vec{V}_{Lc} - \vec{V}_o = \vec{V}_{Sc} \quad (8)$$

Figure 8:
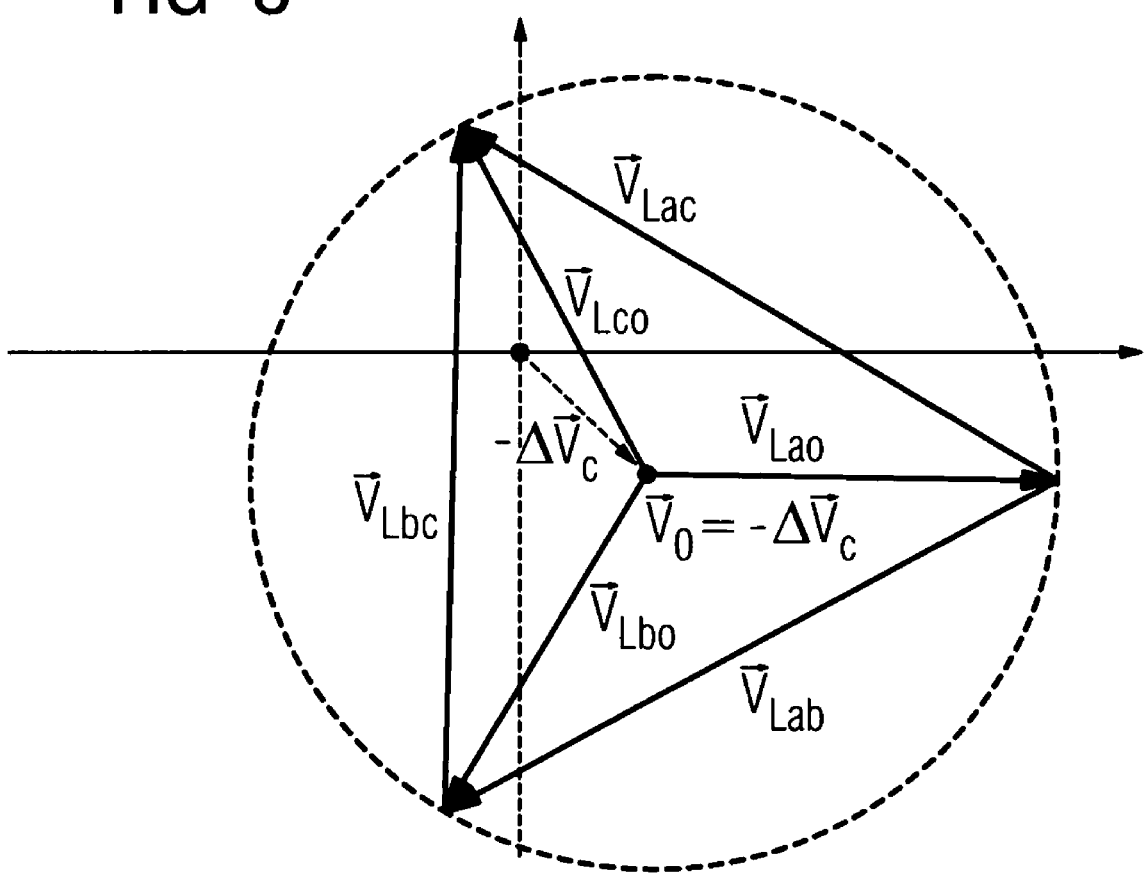
FIG. 8 is a vector graph of a finally compensated load voltage.

It can be seen clearly that, although the center point of the load moves from 0 to $-\Delta\vec{V}_c$, after the compensation the voltages applied on the load side can still be maintained the same as the levels before the fluctuation, as shown in FIG. 8, this can ensure the normal operation of the load during the fluctuations, and the above theoretical analysis has demonstrated the viability of the DVR structure of an embodiment of the present invention.

Compared with the prior structures of three-phase DVR used in the three-phase three-wire power supply systems, roughly one-third of the total number of components can be reduced by using the DVR structure proposed in an embodiment of the present invention. There is no doubt that the reduced costs of DVR will be a strong attraction to users.

What is obvious to those skilled in the art is that, various methods for detecting and controlling the voltage fluctuations (for example instantaneous value comparison, instantaneous reactive power computation, etc.), and various control technologies of the power electronic switch (such as PWM, etc.) can all be used in an embodiment of the present invention.

In an embodiment of the present invention, DVRs are connected in series only to phase A and phase B in the three-phase power supply system to realize the compensation of voltage fluctuations. However, those skilled in the art can understand that the selection of phase A and phase B is only for the sake of exemplary illustration, and this selection can be arbitrary, namely an embodiment of the present invention is suitable for use in any two of arbitrarily selected phases from a three-phase system.

In an embodiment of the present invention, the three-phase three-wire power supply system with star connection is described as an example, but those skilled in the art can understand that, by way of equivalent conversion, the present invention can be used in the same way in a three-phase four-wire power supply system or a three-phase three-wire power supply system with delta connection.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A dynamic voltage compensator for a three-phase power supply system, comprising:
    two dynamic voltage restorers, wherein two phases are selected arbitrarily from said three-phase power supply system, each of the two selected power supply phases being connected in series to one of the two dynamic voltage restorers respectively, and wherein said two dynamic voltage restorers are useable to monitor voltages between a respective one of the power supply phases connected thereto and the unselected power supply phase, and to restore the voltages to a nominal value when a voltage fluctuation is monitored.

2. The dynamic voltage compensator as claimed in claim 1, wherein at least one of said two dynamic voltage restorers comprises a voltage source converter, said voltage source converter comprising at least one pair of a power electronic switch and a diode, for synthesizing an injection voltage.

3. The dynamic voltage compensator as claimed in claim 2, wherein at least one of said two dynamic voltage restorers comprises an energy storage for supplying energy to said voltage source converter and generating the injection voltage.

4. The dynamic voltage compensator as claimed in claim 3, wherein at least one of said two dynamic voltage restorers comprises a harmonic filter for filtering high-order harmonic voltage generated by said voltage source converter.

5. The dynamic voltage compensator as claimed in claim 2, wherein at least one of said two dynamic voltage restorers further comprises an isolation transformer for boosting the injection voltage generated by said voltage source converter and for coupling the injection voltage into a power supply circuit.

6. The dynamic voltage compensator as claimed in claim 2, wherein said power electronic switch is an IGBT or MOS-FET.

7. The dynamic voltage compensator as claimed in claim 1, further comprising a by-pass switch connected between a power supply and a load, and isolating switches arranged respectively between the dynamic voltage restorers and the power supply, and between the dynamic voltage restorers and the load.

8. The dynamic voltage compensator as claimed in claim 1, wherein said dynamic voltage compensator is used in a three-phase three-wire power supply system.

9. The dynamic voltage compensator as claimed in claim 3, wherein at least one of said two dynamic voltage restorers further comprises an isolation transformer for boosting the injection voltage generated by said voltage source converter and for coupling the injection voltage into a power supply circuit.

10. The dynamic voltage compensator as claimed in claim 3, wherein said power electronic switch is an IGBT or MOSFET.

11. The dynamic voltage compensator as claimed in claim 4, wherein at least one of said two dynamic voltage restorers further comprises an isolation transformer for boosting the injection voltage generated by said voltage source converter and for coupling the injection voltage into a power supply circuit.

12. The dynamic voltage compensator as claimed in claim 4, wherein said power electronic switch is an IGBT or MOSFET.

13. A method of using a dynamic voltage compensator, for a three-phase power supply system, including two dynamic voltage restorers, the method comprising:
  arbitrarily selecting two phases from the three-phase power supply system, each of the two selected power supply phase being connected in series to one of the two dynamic voltage restorers respectively; and
  using the two dynamic voltage restorers to monitor voltages between a respective one of the power supply phases connected thereto and the unselected power supply phase, and to restore the voltages to a nominal value when a voltage fluctuation is monitored.

* * * * *